Patented July 5, 1938

2,123,062

UNITED STATES PATENT OFFICE 2,123,062

ABRADANT

Fred G. Pellett, Schenectady, N. Y., assignor to General Electric Company, a corporation of New York No Drawing. Application May 16, 1936, Serial No. 80,141

8 Claims. (Cl. 51—280)

This invention relates broadly to the art of abradants. Although not limited thereto, the invention relates particularly to so-called flexible-backed abradants, such as sand-paper, and the like which are especially adapted for use in the presence of moisture. Such abradants generally comprise (1) a base of flexible sheet material such as paper or cloth, (2) finely divided abrasive material such as quartz, sandstone, alundum, emery, garnet, silicon carbide or the like, and (3) a binder which serves to hold the abrasive in place.

As illustrative of the binding agents now commonly used in abradant manufacture may be mentioned glue, shellac, rubber, water glass (sodium silicate) and clay. Such substances are deficient in one or another of the requisite properties of a binder wholly satisfactory for use in making various abradants. Thus, one binder may have good adhesive properties but will not be resistant to water or other liquid with which the abradant may come in contact during abrading operations. Another binder may be substantially resistant to water but will have low adhesive power. The service life of a particular abradant in a particular use, therefore, has been largely dependent upon, and limited by the properties of the selected binder.

Desirable properties of coating or binding compositions used in manufacturing abradants employed in contact with water are very good resistance of the dried film to water together with good adhesion and high film strength. Such combined properties are not possessed by any single binding agent of the kind hereinbefore mentioned and now in common use in the art.

A principal object of this invention is to provide abradants of improved properties by utilizing a coating or binding composition which, when dried or baked, not only has satisfactory adhesive power but also is exceptionally resistant to water and possesses improved film strength or toughness.

Briefly described my invention comprises a flexible-backed abradant utilizing as a binder for the abrasive particles a specially prepared synthetic resin, namely, a modified alkyd phenolaldehyde type resin.

My invention will be best understood by reference to the following specific examples of the preparation of the binding compositions which I may employ, which examples are merely illustrative in nature:

Example 1

| | Parts by weight |
|---|---|
| Glycerol | 15.9 |
| Phthalic anhydride | 29.7 |
| Linseed oil acids | 27.3 |
| Refined linseed oil | 14.7 |
| Phenol-aldehyde type resin | 12.4 |

The stated amounts of glycerol, phthalic anhydride, linseed oil acids and refined linseed oil are placed in a suitable container and therein heated to about 190°–200° C. This temperature is maintained until the resulting resin is clear, after which it is increased to approximately 230°–240° C. After digesting at this higher temperature for about 1½ hours, the stated amount of phenol-aldehyde type resin is added. Cooking is continued for about 3 to 4 hours longer at a temperature of about 230°–240° C. to the end-point, which is determined by testing a small pill of the material on a hot plate. The requisite end-point is a 10 to 15 second cure at about 200° C. of a small pill. At this point heat treatment of the mass is stopped and it is blended with a solvent therefor, for example, toluol or xylol alone or mixed, or with other suitable solvents. To the solution of resin advantageously is added a small amount of a drier such as one or more of the usual lead, cobalt or manganese compounds of this class, for instance, about 0.16 per cent lead in the form of lead linoleate and 0.016 per cent cobalt in the form of cobalt linoleate, by weight, calculated on the basis of solvent-free resin. The drier is conveniently added in solution form to the solution of resin.

The liquid coating or binding composition resulting from the process described, and from other processes to be mentioned hereinafter by way of example, provides a dried or baked film that is strong and unusually resistant to water. The composition is homogeneous and possesses good adhesive or binding power. In general, its properties make it especially suitable for the manufacture of abradants, particular abradants intended for use in the presence of moisture such as sand-paper intended for wet-sanding operations.

Example 2

| | | Parts by weight |
|---|---|---|
| Group 1 | Linseed oil acids | 13.6 |
| | Paraformaldehyde | 5.2 |
| | Xylenol | 8.4 |
| Group 2 | Glycerol | 17.8 |
| | Phthalic anhydride | 27.1 |
| | Linseed oil acids | 15.5 |
| | Refined linseed oil | 12.4 |

The ingredients of Group 1 are heated to about 90° to 95° C. and the temperature then is raised to about 120° to 130° C. over a period of about 40 minutes. The ingredients of Group 2 are heated separately to about 190° to 200° C. and maintained at that temperature for about one hour. This mixture is cooled to about 135° C. and the first reaction mixture added thereto. The whole is now heated gradually to about 230° to 240° C. and held at that temperature to the requisite end-point, which is about an 8 to 12 second cure at about 200° C. of a small pill of the material, said end-point being reached after about 2 hours' additional cooking. The resinous product is blended with a suitable solvent and drier added thereto as in the previous example. The coating or binding composition thus obtained has properties substantially the same as the product of the process described under Example 1.

In the reaction of the ingredients of Group 1, the linseed oil acids possibly may act as a catalyst for the reaction, but in any event they serve as a vehicle and provide a resinous composition that unites homogeneously with the reaction product of the ingredients of Group 2.

As a further variation I may digest the starting materials employed in making the phenol-aldehyde type resin with drying oil in place of all or a part of the drying oil acids, using a small amount of acetic or other oil-soluble acid as a catalyst for the reaction.

*Example 3*

|   | Parts by weight |
|---|---|
| Phenol | 20.0 |
| Paraformaldehyde | 8.0 |
| Drying-oil-modified alkyd resin | 72.0 |

The ingredients are heated to about 120° to 130° C. for approximately 2½ hours after which the temperature is raised gradually to about 220° to 230° C. The mass is held at that temperature to the requisite end-point, which is reached after about 1½ hours' cooking at the temperature stated. The resinous product is thereafter blended with a suitable solvent and drier added thereto as described under Example 1.

*Example 4*

|   | Parts by weight |
|---|---|
| Glycerol | 10.5 |
| Phthalic anhydride | 13.9 |
| China-wood oil acids | 38.5 |
| Phenol-aldehyde type resin | 37.1 |

The ingredients are heated slowly to about 220° to 230° C. and maintained at that temperature to the requisite end-point, which is about an 8 to 12 second cure at about 200° C. of a small pill of the material. The resinous product is blended with a suitable solvent as described under Example 1.

In utilizing this composition drying or baking either for a comparatively short period of time or at a comparatively low temperature, or both, may prove necessary to avoid excessive brittleness of a film thereof.

*Example 5*

|   |   | Parts by weight |
|---|---|---|
| Group 1 | Perilla oil | 45.10 |
|   | Glycerol | 6.80 |
|   | Potassium carbonate | 0.05 |
| Group 2 | Glycerol | 5.40 |
|   | Phthalic anhydride | 28.15 |
|   | Phenol-aldehyde type resin | 14.50 |

The ingredients of Group 1 are heated to about 220° to 230° C. and maintained at that temperature for about 2½ hours, after which the ingredients of Group 2 are added. This addition lowers the temperature, which is then gradually raised to the former temperature of about 220° to 230° C. and cooking continued to the requisite end-point, which is about a 10 to 15 second cure at about 200° C. of a small pill of the material. The product is blended with a suitable solvent and drier added thereto as described under Example 1.

This example illustrates formulation utilizing all drying oil and no drying oil acids, and wherein the reaction between the ingredients of Group 1 is one of alcoholysis.

In making the phenol-aldehyde type resin I may use instead of paraformaldehyde other aldehydes such, for example, as furfural and acetaldehyde; and in place of phenol or xylenol I may use other phenolic compounds, for example, cresol or substituted phenols such as para-phenylphenol, para-tertiary-butyl phenol or para-tertiary-amyl phenol. Use of a phenol-aldehyde type resin made with such substituted phenols results in a product that dries more quickly to the desired point.

In making the drying-oil-modified alkyd resin, I may use such polyhydric alcohols as glycerol, pentaerythritol, mannitol, ethylene glycol, diethylene glycol, propylene glycol, and the like; such polybasic carboxylic acids as phthalic, succinic, adipic, fumaric, maleic acids and the like, or anhydrides thereof; and such drying oils (and acids thereof) as linseed oil, tung or China-wood oil, perilla oil and the like.

In making my phenol-aldehyde-modified, drying-oil modified alkyd resin, the phenol-aldehyde type resin may be added (as was shown by Example 4) at the beginning of the digestion period with good results, in which case the drying-oil-modified alkyd resin is formed in the presence of the phenol-aldehyde type resin.

Other variations in the ingredients and the proportions thereof, and in the process of combining the selected ingredients, are contemplated. For example, when certain particular properties are desired in the end-product, it may be advantageous to use instead of linseed oil other drying oils or mixtures thereof. Thus, substituting perilla oil and perilla oil acids for linseed oil and linseed oil acids yields a resinous composition the solutions of which are less viscous than similar solutions of a composition made with linseed oil and linseed oil acids; and a film resulting from baking a composition made with perilla oil and acids thereof possesses apparently greater toughness and water resistance than a film resulting from a similar baking of a composition made with linseed oil and its acids. Formulation may be further varied by using all drying oil acids (with enough added glycerol to esterify) and no drying oil.

In place of 100 per cent phenol-aldehyde type resins, rosin-modified phenol-aldehyde type resins may be used. Generally, however, use of 100 per cent phenol-aldehyde type resin in formulation is preferable because of the greater resistance to water of films of coating compositions thus made.

Another contemplated variation is to digest a drying-oil-modified alkyd resin with a resin such as disclosed by C. S. Ferguson in U. S. Patent No. 1,896,842 and which comprises a phenol-aldehyde type resinous composition homogeneously united with drying oil.

By varying the formulation of my phenol-aldehyde-modified, drying-oil-modified alkyd resin, the properties can be varied to fit specific needs. For example, the xylenol-formaldehyde resins impart properties which are desirable for a baking varnish wherein a light color is not necessary, but if air-drying properties are required or a light-colored film is desired, or both, such resins as phenol-aldehyde resins made with substituted phenols are much to be preferred.

It is my conception that the advantage of the prolonged period of cooking of drying-oil-modified alkyd resin (or ingredients or constituents thereof) in the presence of phenol-aldehyde type resin is probably due either to a chemical interaction between the phenol-aldehyde type resin and one or more of the ingredients or constituents of the drying-oil-modified alkyd resin; or that the presence of the phenol-aldehyde type resin retards gelation of the drying-oil-modified alkyd resin and thereby allows a more complete reaction between the ingredients used in making the alkyd resin. Whatever the explanation may be, the fact remains that in the resulting resinous composition the components thereof are homogeneously united either chemically or otherwise; and the process provides a new and novel resinous composition having properties not obtainable by a mere blending of a drying-oil-modified alkyd resin with a phenol-aldehyde type resin.

Having obtained a liquid coating or binding composition possessing the improved properties hereinbefore set forth, the abradant is made by providing a covering, by any suitable means, for a supporting medium such as paper, cloth, or other fibrous or other material. This covering consists of any desired abrasive such as the kinds hereinbefore mentioned by way of example imbedded in the water-resistant resinous composition that results from a heat treatment or baking at a suitable temperature (e. g., about 50° to 90° C.) of a phenol-aldehyde-modified, drying-oil-modified alkyd resin of the kind hereinbefore described. The abrasive may be mixed with the liquid resinous coating composition and the whole then applied to the paper or other sheet material; or the coating composition may be applied to the sheet material and the grains of abrasive material subsequently imbedded therein; or a combination of both these means may be employed.

Abradants made in accordance with my invention have a high degree of utility in the presence of moisture as a result of the superior resistance of the dried resinous coating to moisture and the great power or capacity of said coating to hold the abrasive in place, particularly when wet. A characteristic of abradants produced by my invention is their comparatively long service life especially when used in the presence of moisture.

The term "drying oil" as used broadly in the claims which follow is intended to include within its meaning drying oil fatty acids.

What I claim as new and desire to secure by Letters Patent of the United States is:

1. A flexible-backed abradant especially adapted for wet sanding operations comprising a flexible base coated with particles of abrasive imbedded in a water-resisting resinous composition which is the hardened homogeneous product resulting from reacting drying-oil-modified alkyd resin with a lesser but substantial proportion of phenol-aldehyde resin at an elevated temperature to a predetermined cure point.

2. A flexible-backed abradant comprising a flexible base, a hardened, water-resistant coating thereon consisting of a homogeneous product resulting from digestion under heat, to a predetermined cure point, a phenol-aldehyde type resin and a preponderant proportion of the product of reaction of a polyhydric alcohol, a polybasic carboxylic acid and a drying oil, and particles of abrasive material imbedded in said coating.

3. A flexible-backed abradant comprising a flexible sheet material, a hardened, water-resistant coating thereon consisting of a homogeneous product resulting from reacting under heat glycerol, a polybasic carboxylic acid, linseed oil and acids thereof in the presence of phenol-aldehyde type resin in an amount less than one-half by weight of the whole said reaction being carried out at an elevated temperature to a predetermined cure point, and particles of abrasive material imbedded in said coating.

4. A flexible-backed abradant comprising paper, a hardened, water-resistant coating thereon consisting of a homogeneous product resulting from digesting under heat, to a predetermined cure point, the reaction product of para-formaldehyde and xylenol with a preponderant proportion of the reaction product of glycerol, phthalic anhydride, and drying oil and acids thereof, and particles of abrasive material imbedded in said coating.

5. A flexible-backed abradant comprising a fibrous sheet material, a hardened, water-resistant coating thereon consisting of a homogeneous product resulting from digesting under heat, to a predetermined cure point, phenol-aldehyde type resin and a preponderant proportion by weight of the whole of the product of reaction of a polyhydric alcohol, a polybasic carboxylic acid, and perilla oil and acids thereof, and particles of abrasive material imbedded in said coating.

6. A flexible-backed abradant particularly adapted for wet sanding operations comprising a flexible backing coated with particles of abrasive carried in a water-resistant resinous composition which is the homogeneous product obtained by reaction under heat, to a predetermined cure point, of glycerol, phthalic anhydride, linseed oil, linseed oil acids and phenol-aldehyde resin, the proportion of alkyd resin in the combined mass predominating over the proportion of phenol-aldehyde resin.

7. A flexible-backed abradant particularly adapted for wet sanding operations comprising a flexible supporting medium coated with particles of abrasive material imbedded in a water-resisting resinous composition which is the hardened homogeneous product resulting from reacting from about 63 to 88 per cent by weight of drying-oil-modified alkyd resin with about 37 to 12 per cent by weight of phenol-aldehyde resin at an elevated temperature to a predetermined cure point, the drying oil content of said composition being about 38 to 45 per cent by weight of the whole.

8. A flexible-backed abradant especially adapted for wet sanding operations comprising a flexible sheet material coated with particles of abrasive material carried in a hardened, water-resistant resinous composition which is the homogeneous product resulting from heating a liquid resinous composition comprising a volatile solvent and the product of reacting about 12 to 14 per cent phenol-aldehyde resin material, about 16 to 18 per cent glycerol, about 27 to 30 per cent phthalic anhydride, and the remainder linseed oil and linseed oil fatty acids, said percentages being by weight and said reaction being carried out at an elevated temperature to a cure point of about 8 to 15 seconds when a small pill of the material is heated at about 200° C.

FRED G. PELLETT.

DISCLAIMER 2,123,062.—*Fred G. Pellett*, Schenectady, N. Y. ABRADANT. Patent dated July 5, 1938. Disclaimer filed April 29, 1941, by the assignee, *General Electric Company*.

Hereby enters this disclaimer to claims 1 and 2 of said Letters Patent.

[*Official Gazette May 20, 1941.*]